US009694628B2

(12) United States Patent
Chen

(10) Patent No.: US 9,694,628 B2
(45) Date of Patent: Jul. 4, 2017

(54) PNEUMATIC TIRE FOR ALL-TERRAIN VEHICLE USED IN SANDY LAND

(71) Applicant: Cheng Shin Rubber (Xiamen) Ind., Ltd., Xiamen, Fujian Province (CN)

(72) Inventor: Shiu-Hsiung Chen, Xiamen (CN)

(73) Assignee: CHENG SHIN RUBBER (XIAMEN) IND., LTD, Xiamen (CN)

( * ) Notice: Subject to any disclaimer, the term of this patent is extended or adjusted under 35 U.S.C. 154(b) by 247 days.

(21) Appl. No.: 14/581,827

(22) Filed: Dec. 23, 2014

(65) Prior Publication Data

US 2015/0375569 A1 Dec. 31, 2015

(30) Foreign Application Priority Data

Jun. 30, 2014 (CN) .......................... 2014 1 0307309

(51) Int. Cl.
*B60C 11/03* (2006.01)
*B60C 11/11* (2006.01)

(52) U.S. Cl.
CPC ....... *B60C 11/0311* (2013.01); *B60C 11/0302* (2013.01); *B60C 11/11* (2013.01); *B60C 2011/0313* (2013.01); *B60C 2200/14* (2013.01)

(58) Field of Classification Search
CPC .......... B60C 2200/06; B60C 2200/065; B60C 2200/08; B60C 2200/10; B60C 2200/12; B60C 2200/14; B60C 11/0311; B60C 2011/0313; B60C 11/11; B60C 11/0306; B60C 11/0332
USPC .......... 152/209.12, 209.15, 209.28; D12/544
See application file for complete search history.

(56) References Cited

U.S. PATENT DOCUMENTS

| | | | | |
|---|---|---|---|---|
| D323,135 | S * | 1/1992 | Thomas | D12/504 |
| 8,181,683 | B2 | 5/2012 | Nagai | |
| 8,701,724 | B2 | 4/2014 | Colombo et al. | |
| 2012/0305155 | A1 | 12/2012 | Hamanaka | |

FOREIGN PATENT DOCUMENTS

JP 2000-25417 * 1/2000

* cited by examiner

*Primary Examiner* — Eric Hug

(57) ABSTRACT

A pneumatic tire for all-terrain vehicle is disclosed which comprise a tread, and a plurality of primary blocks extending in a tire circumferential direction disposed symmetrically on the tread with respect to a center line of the tread, each primary block being evenly spaced with each other; two pairs of secondary block arrays arranged respectively on areas between any two adjacent primary blocks which are symmetrical with respect to the circumferential center line of the tread; a prior ground engaging edge created on a ground engaging surface when the ground engaging surface of the primary blocks may be inclined to a moving direction of the tire; and a plurality of stepped humps located on the prior ground engaging edge. The turning manipulation performance of the tires in sandy land can be highly improved while the straight-running traction performance is not affected due to the above configuration of the invention.

7 Claims, 5 Drawing Sheets

PNEUMATIC TIRE FOR ALL-TERRAIN VEHICLE USED IN SANDY LAND

CROSS-REFERENCE TO THE RELATED APPLICATION

This application is based on and claims the benefit of priority from earlier Chinese Patent Application No. 201410307309.5 filed on Jun. 30, 2014, the whole description of which is incorporated herein by reference.

TECHNICAL FIELD OF THE INVENTION

The present invention relates to a tire for vehicle, and more particularly, to a pneumatic tire for all-terrain vehicle used in sandy land.

BACKGROUND OF THE INVENTION

At present, the domestic market of ATV (all-terrain vehicle) develops very rapidly, and more and more consumers are keen on this new model with multi-functions, while driving ATV in sand dunes and deserts is becoming a new kind of entertainment.

While the ATV running in sand dunes, as the sand is relatively loose, it is difficult for its tires to concentrate so as to provide relevant traction. To improve the traction performance of the tires in sand dunes, the conventional tread pattern of the ATV tire is shown in FIG. 1, i.e. the tread of the tire is provided with a plurality of block 10' which has less ground contact area, and traverses through the whole tread width. In addition, a curved surface design is generally applied to the shoulder of the tire so as to increase traction performance of the tire. The tire with such tread pattern can make the block cut into the sand rapidly so as to improve the traction performance, while turning in sand, the problem with bad turning manipulation performance will be caused by small ground contact area and wide transverse groove of the tread. Meanwhile, during the straight forwarding process, it is easy for the sand particles not concentrate effectively and straight-running traction performance will be reduced because the first ground-contacting edge of the tire is a smooth curved surface.

SUMMARY OF THE INVENTION

It is therefore the object of the present invention to overcome the above-mentioned problem, and provide a pneumatic tire for all-terrain vehicle used in sandy land, which can improve the turning manipulation performance in sandy land without affecting the straight-running traction performance.

To achieve the above-mentioned object, the present invention provides a pneumatic tire for all-terrain vehicle used in sandy land comprising a tread, wherein the tread comprises:

a plurality of primary blocks extending in a tire circumferential direction disposed symmetrically on the tread with respect to a center line of the tread, each primary block being evenly spaced with each other;

two pairs of secondary block arrays arranged respectively on areas between any two adjacent primary blocks which are symmetrical with respect to the circumferential center line of the tread;

a prior ground engaging edge created on a ground engaging surface when the ground engaging surface of the primary blocks may be inclined to a moving direction of the tire; and a plurality of stepped humps located on the prior ground engaging edge extending from the center line of the tread to an axially external end.

Additionally, with the pneumatic tire according to the present technology, the secondary block array comprises at least one row of secondary blocks, and each row of secondary block substantially deviates from the circumferential center line relative to a moving direction of the tire.

Additionally, with the pneumatic tire according to the present technology, the secondary block array comprises an inner row and an outer row.

Additionally, with the pneumatic tire according to the present technology, the secondary blocks in outer row deviate from the circumferential center line of the tire by an angle included between about 15 degrees to about 45 degrees and the secondary blocks in inner row deviate from the circumferential center line of the tire by an angle included between about 8 degrees to about 30 degrees.

Additionally, with the pneumatic tire according to the present technology, the inner side of each secondary block in outer row is inclined to a normal plane of the ground engaging edge of the said block by an angle included between about 15 degrees to about 30 degrees; and the outer side of each secondary block in outer row is inclined to a normal plane of the ground engaging edge of the said block by an angle included between about 0 degrees to about 15 degrees.

Additionally, with the pneumatic tire according to the present technology, the outer side of each secondary block in inner row is inclined to a normal plane of the ground engaging edge of the said block by an angle included between about 15 degrees to about 30 degrees; and the inner side of each secondary block in inner row is inclined to a normal plane of the ground engaging edge of the said block by an angle included between about −5 degrees to about 15 degrees.

Additionally, with the pneumatic tire according to the present technology, the ratio of the width of the hump to the width of the primary block is 0.4 to 0.8.

Additionally, with the pneumatic tire according to the present technology, the ratio of the interval width of two adjacent humps to the length of primary block is 0.05 to 0.2.

Additionally, with the pneumatic tire according to the present technology, the ratio of the array length of the secondary blocks to the circumferential length of a single tread pattern unit is 0.3 to 0.7.

Additionally, with the pneumatic tire according to the present technology, the ratio of the height of each secondary block in the secondary block arrays to the height of the primary block is 0.3 to 0.6, and the ratio of the width of each secondary block in the secondary block arrays to the width of the primary block is 0.5 to 1.0.

The turning manipulation performance of the tires in sandy land can be highly improved while the straight-running traction performance is not affected, because the following technical features are introduced: the primary blocks extending in a tire circumferential direction disposed symmetrically on the tread with respect to a center line of the tread, and a plurality of secondary block arrays arranged on areas between any two adjacent primary blocks, in which a plurality of stepped humps located on the prior ground engaging edge extending from the center line of the tread to an axially external end and the secondary block array is mainly composed of an inner row and an outer row, each having different specific circumferential, height and sidewall angle.

BRIEF DESCRIPTION OF THE DRAWINGS

The features of the present invention may be clearly set forth with reference to the accompanying drawings. The invention, together with the advantages thereof may be best understood by reference to the following description taken in conjunction with the accompany drawings, wherein like reference signs identify like elements, and wherein.

DETAILED DESCRIPTION OF THE INVENTION

The structure of the tire of the invention will be explained in detail with reference to the accompany drawings. The description and explanatory embodiment herein are merely used to set forth the present invention, not to limit the invention.

Figure 1:
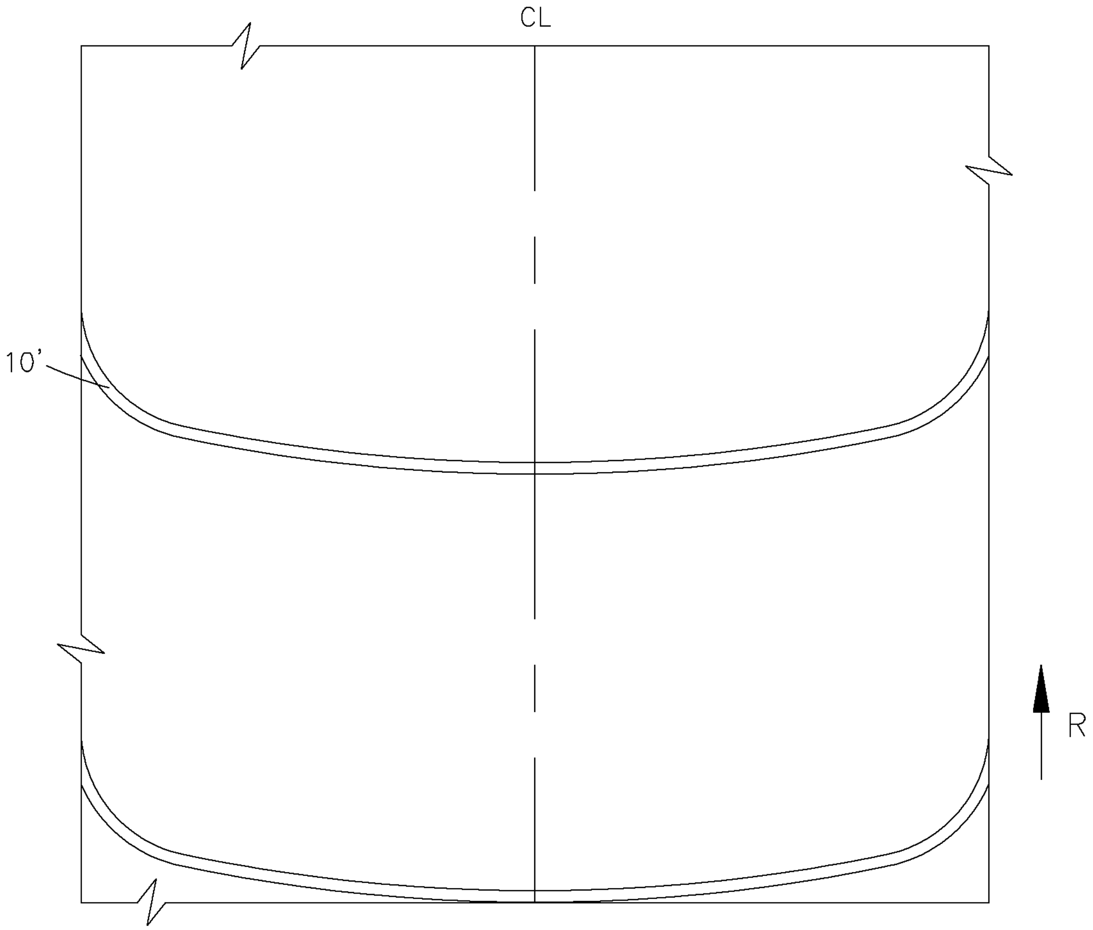
FIG. 1 is an expanded view of the tread pattern of a tire in prior art.
Figure 2:
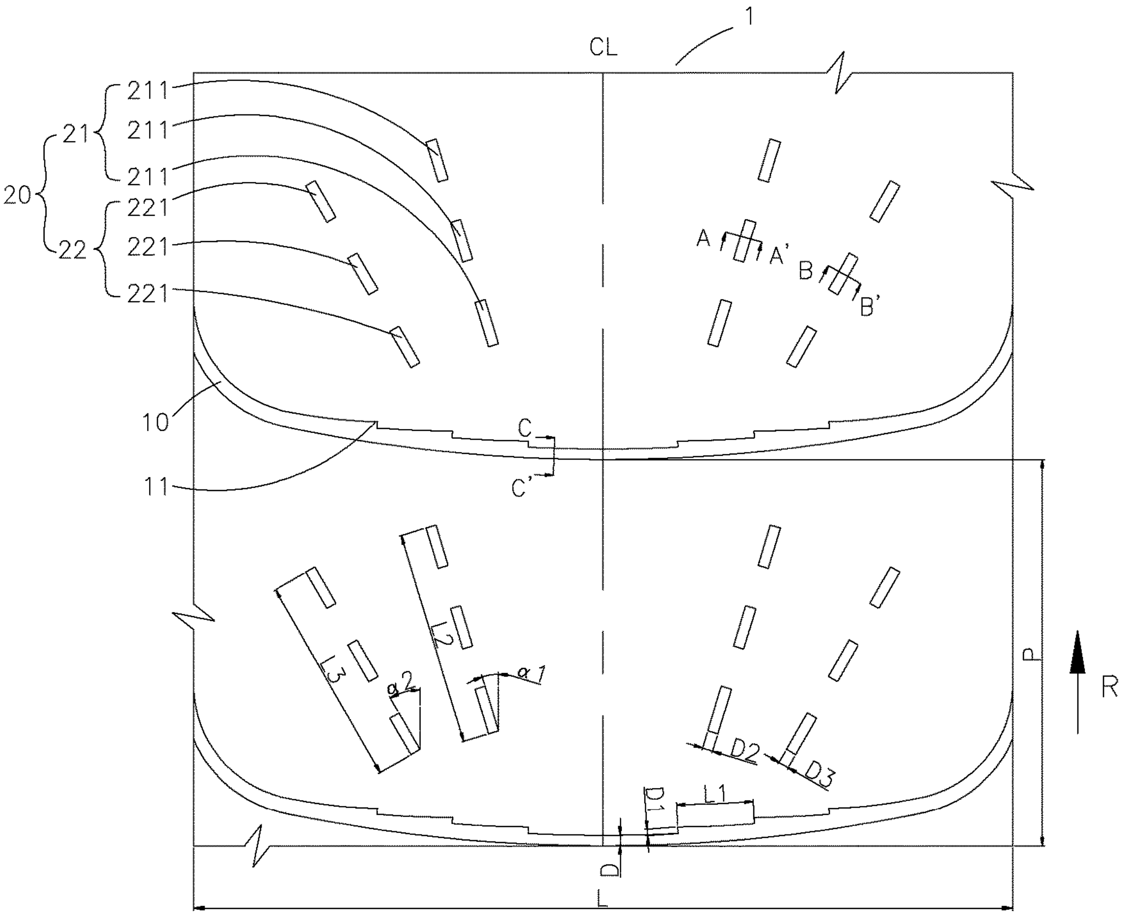
FIG. 2 is an expanded view of the tread pattern of the tire according to the present invention.

As shown in FIG. 2, it illustrates a pneumatic tire for all-terrain vehicle used in sandy land according to one embodiment of the present invention. The tire includes a tread 1, in which the tread comprises a plurality of primary blocks 10 extending in a tire circumferential direction disposed symmetrically on the tread 1 with respect to a center line (CL) of the tread 1, each primary block 10 being evenly spaced with each other; and two pairs of secondary block arrays 20 arranged respectively on areas between any two adjacent primary blocks 10 which are symmetrical with respect to the circumferential center line of the tread 1.

Figure 3:
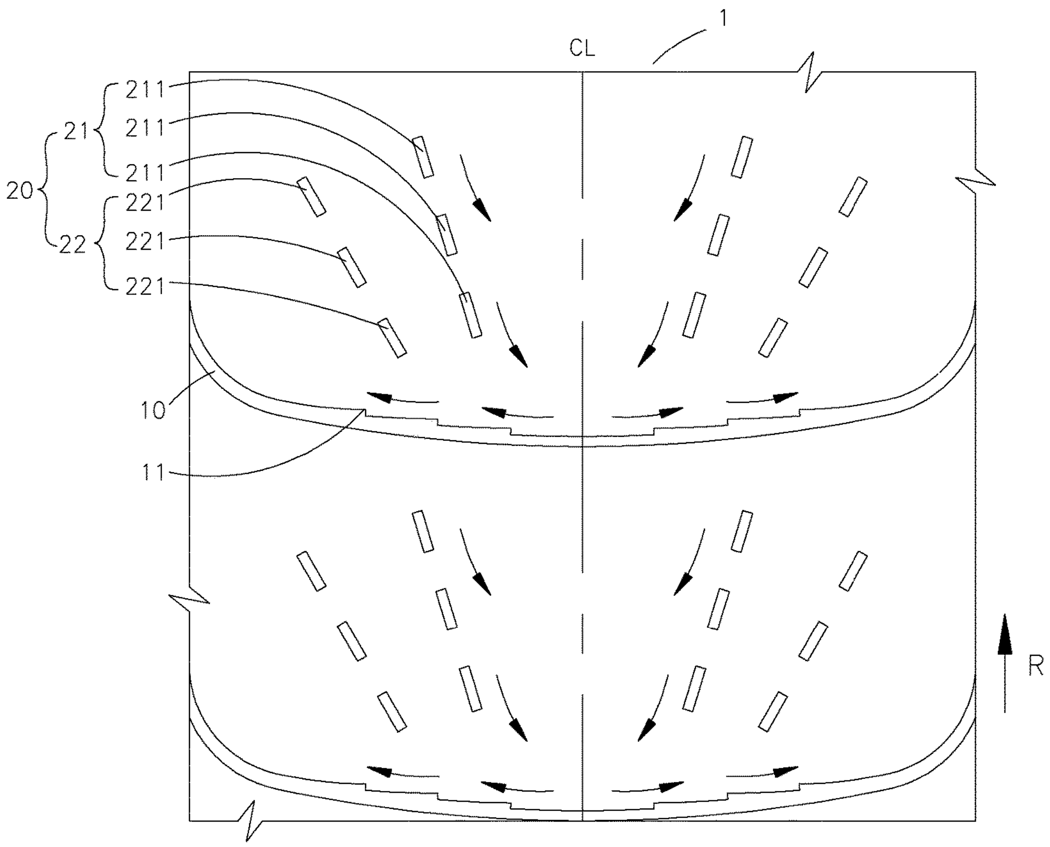
FIG. 3 is a schematic view showing the sand flow while the tire according to the present invention is running straight forward.
Figure 7:
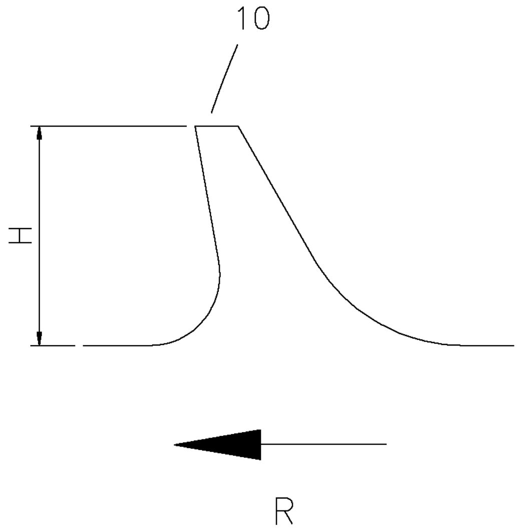
FIG. 7 is a cross-section view taken along line C-C' of FIG. 2.

The secondary block array 20 can provide a proper sliding resistance when the tire is turning, wherein the ground engaging surface of the primary block 10 is inclined relative to the moving direction of the tire so as to create a prior ground engaging edge which comprises a plurality of stepped humps 11 extending from the center line of the tread to an axially external end. As shown in FIG. 7, the prior ground engaging edge is inclined with respect to a moving direction of the tire, which may improve traction performance of the tire. As shown by the arrows in FIG. 3, when the tire is running straight forward, the sand will be discharged towards the axial outside along the side wall of the prior ground engaging edge of the primary block 10. Meanwhile, the humps 11 may increase the resistance of the sand discharged towards the axial outside along the side wall of the prior ground engaging edge of the primary block 10, so that the sand can concentrate at the prior ground engaging edge of the primary block 10 to provide better straight-running traction performance. The ratio of the width D1 of hump 11 to the width D of the primary block 10 is 0.4 to 0.8. The oversized width of hump 11 may increase the resistance to cut into the sand of the primary block 10, and reduce straight-running traction performance, on the other hand, the undersized width of hump 11 cannot concentrate sand efficiently, and cannot improve the straight-running traction performance efficiently. To get higher straight-running traction performance of the tire, the ratio of the interval width L1 of two adjacent humps 11 to the length L of the primary block is 0.05 to 0.2. Undersized interval width L1 may increase the resistance to cut into the sand of the primary block 10 and reduce its traction performance, on the other hand, oversized interval width L1 cannot concentrate sand efficiently, and cannot improve the straight-running traction performance efficiently.

Figure 4:
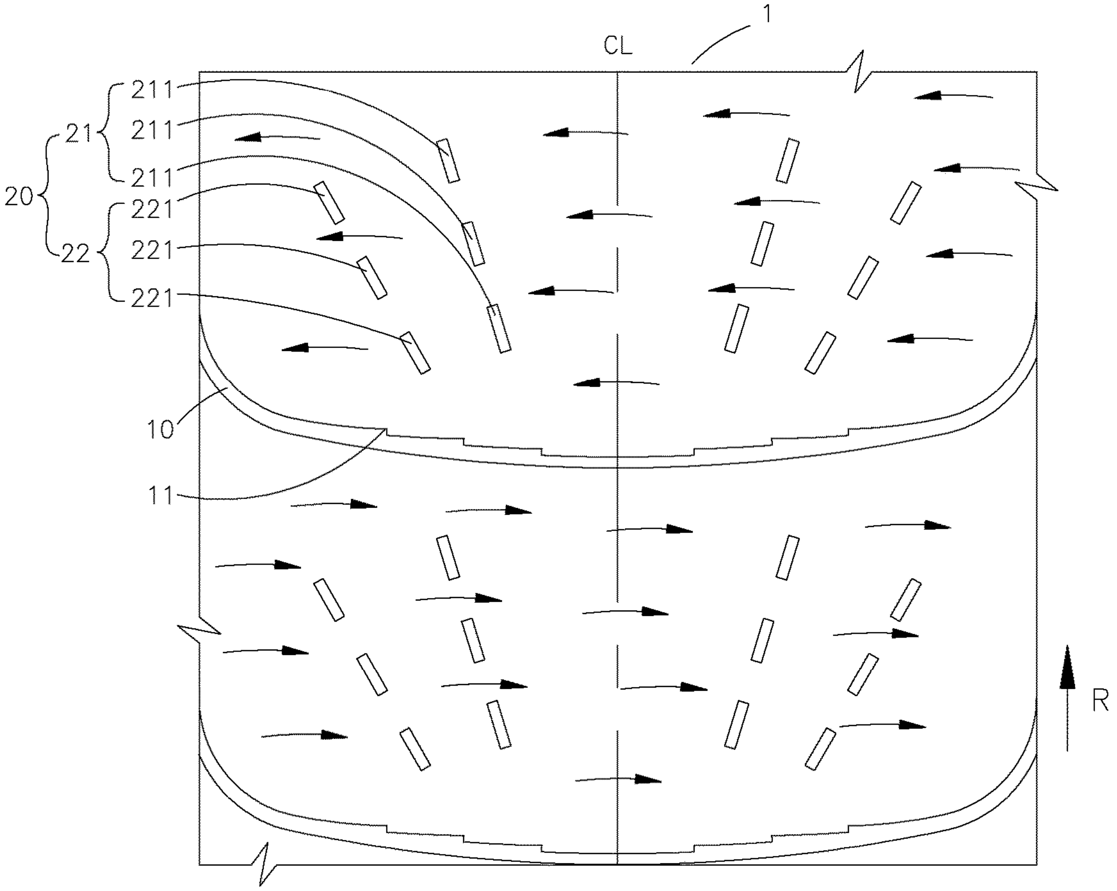
FIG. 4 is a schematic view showing the sand flow while the tire according to the present invention is turning.

Each secondary block array 20 comprises at least one row of secondary blocks, each row of which substantially deviates from the circumferential center line from one side to the other relative to a moving direction of the tire. In one embodiment of the invention shown in FIG. 2~FIG. 4, each secondary block array 20 comprises two rows of secondary blocks, which are inner secondary block row 21 and outer secondary block row 22. The ratio of the array length L2 of the inner secondary block row 21 to the circumferential length P of a single tread pattern unit is 0.3 to 0.7, and the ratio of the array length L3 of the outer secondary block row 22 to the circumferential length P of a single tread pattern unit is 0.3 to 0.7, by which configuration over-reduction of the turning slippage which may cause poor manipulation performance can be easily avoided. The inner secondary block row 21 and the outer secondary block row 22 separately deviates from the circumferential center line relative to a moving direction of the tire. The angle $\alpha$1 of the inner secondary block row 21 deviating from the center line CL of the tire is about 8 degrees to about 30 degrees, preferably about 10 degrees to 20 degrees. As shown by the arrow in FIG. 3, when the tire is moving straight forward, such structure can create an effective guiding surface for sand which guides sand to concentrate near the side wall of the prior ground-engaging edge of the primary block 10, improving the straight-running traction performance. The angle $\alpha$2 of the outer secondary block row 22 deviating from the center line CL of the tire is about 15 degrees to about 45 degrees, which can provide proper sliding resistance when the tire is turning, improving the turning manipulation performance.

Figure 5:
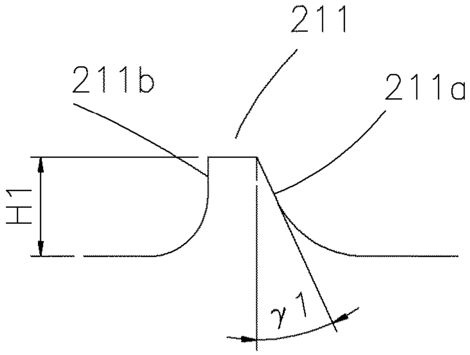
FIG. 5 is a cross-section view taken along line A-A' of FIG. 2.
Figure 6:
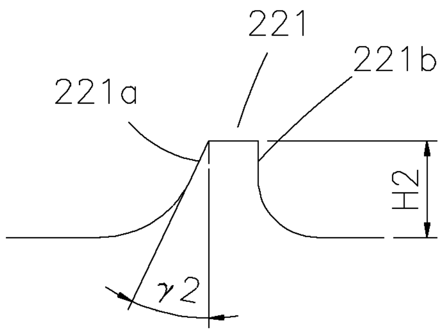
FIG. 6 is a cross-section view taken along line B-B' of FIG. 2.

As shown in FIG. 2, FIG. 5 and FIG. 6, the outer secondary block row 22 comprises a plurality of outer secondary blocks 221, and the inner secondary block row 21 comprises a plurality of inner secondary blocks 211. The angle $\gamma$2 between the inner side 221*a* of each outer secondary block 221 and the normal plane of prior ground-engaging edge in which the secondary block the inner side 221*a* is located is about 15 degrees to about 30 degrees, the angle $\gamma$1 between the outer side 211*a* of each inner secondary block 211 and the normal plane of the ground-engaging edge in which the secondary block the outer side 211*a* is located is about 15 degrees to about 30 degrees, by which configuration the base strength of the inner secondary block 211 and the outer secondary block 221 can be definitely guaranteed, so that it will not be damaged too early to provide a favor for the turning manipulation performance. The angle $\gamma$4 between the outer side 221*b* of each outer secondary block 221 and the normal plane of the ground-engaging edge in which the secondary block the outer side 221*b* is located is about 0 degrees to about 15 degrees, as shown in FIG. 6, the angle $\gamma$4 is 0 degree. Such setting can form an effective outer side wall of the secondary block which provide a proper sliding resistance when the tire is turning so that the tire will not slip excessively to result in poor manipulation performance. The angle γ3 between the inner side 211*b* of each inner secondary block 211 and the normal plane of the ground-contacting edge in which the secondary block the inner side 211*b* is located is about −5 degrees to about 15 degrees, as shown in FIG. 5, the angle γ3 is 0 degree. When the tire is turning, such setting will form an effective prior ground-engaging edge of the secondary block, which can reduce the cutting resistance into sand of the inner secondary block 211, and can provide an auxiliary traction force when turning, so that better turning manipulation performance of the tire can be achieved.

As shown in FIG. 2, FIG. 5, FIG. 6 and FIG. 7, the ratio of the height H1 of each inner secondary block 211 to the height H of the primary block 10 is 0.3 to 0.6, and the ratio of the height H2 of each outer secondary block 221 to the height H of the primary block 10 is 0.3 to 0.6, by which configuration enough strength of the inner secondary blocks 211 and outer secondary blocks 221 can be well guaranteed, so as to improve the straight-running traction performance and turning manipulation performance. Oversized height H1 and H2 will greatly increase the sliding resistance when the tire is turning, which will reduce the turning performance, on the contrary, undersized height H1 and H2 will not bring the favor for turning manipulation performance. The ratio of width D2 of the inner secondary block 211 to the width D of the primary block 10 is 0.5 to 1.0, and the ratio of width D3 of the outer secondary block 221 to the width D of the primary block 10 is 0.5 to 1.0, by which configuration enough strength of the inner secondary blocks 211 and outer secondary blocks 221 may be well guaranteed, so as to improve the straight-running traction performance and turning manipulation performance.

In one embodiment of the invention, tests and evaluation for a plurality of samples of the above tire sized 27×12.00-14 which adopts the above-mentioned tread pattern structure in accordance with the present invention has been conducted. Straight-running traction performance, turning manipulation performance and overall performance are evaluated through the driver's sense by 10-point method under the condition that the vehicles which are equipped with the above tires are moved on a sand dune. The conventional example scores 5 points, which means the more the scores are, the better the performance is.

The detailed test conditions are as follows:

Rim: 9.0 AT X14

Vehicle: ATV of gas displacement 800 cc

Test operate pressure: 80 kPa

Test terrain: sand dune

The test result is shown in Table 1:

TABLE 1

| | Conventional example | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Humps | NO | YES | YES | NO | NO | NO | NO | NO | NO | NO | NO | NO |
| Ratio of D1 to D | — | 0.6 | 0.6 | — | — | — | — | — | — | — | — | — |
| Ratio of L1 to L | — | 0.1 | 0.1 | — | — | — | — | — | — | — | — | — |
| Secondary blocks | NO | NO | YES | YES | YES | YES | YES | YES | YES | YES | YES | YES |
| α1 | — | — | 17° | 17° | 0° | 30° | 17° | 17° | 17° | 17° | 17° | 17° |
| α2 | — | — | 30° | 30° | 30° | 30° | 17° | 30° | 30° | 30° | 30° | 30° |
| Ratio of L1 (L2) to P | — | — | 0.54 | 0.54 | 0.54 | 0.54 | 0.54 | 0.54 | 0.54 | 0.54 | 0.54 | 0.54 |
| γ3 | — | — | 0° | 0° | 0° | 0° | 0° | 25° | 0° | 0° | 0° | 0° |
| γ4 | — | — | 0° | 0° | 0° | 0° | 0° | 0° | 25° | 0° | 0° | 0° |
| γ1 (γ2) | — | — | 25° | 25° | 25° | 25° | 25° | 25° | 25° | 0° | 25° | 25° |
| Ratio of H1 (H2) to H | — | — | 0.5 | 0.5 | 0.5 | 0.5 | 0.5 | 0.5 | 0.5 | 0.5 | 0.2 | 0.5 |
| Ratio of D2 (D3) to D | — | — | 1 | 1 | 1 | 1 | 1 | 1 | 1 | 1 | 1 | 0.5 |
| Straight-running traction performance | 5 | 6 | 7 | 6 | 5.5 | 5.5 | 6 | 6 | 6 | 5.5 | 5.5 | 5.5 |
| Turning manipulation performance | 5 | 5 | 7 | 7 | 6.5 | 6 | 5.5 | 6 | 5.5 | 5.5 | 5.5 | 5.5 |
| Overall performance | 5 | 5.5 | 7 | 6.5 | 6 | 6 | 5.5 | 6 | 5.5 | 5.5 | 5.5 | 5.5 |

While a particular embodiment of the invention has been shown and described, it will be obvious to those skilled in the art that changes and modifications can be made without departing from the true spirit and scope of the invention. It should be understood that the embodiments of the present invention described above are illustrative only, and all the changes and modifications made by those skilled in the art are covered by the appended claims.

What is claimed is:

1. A pneumatic tire for all-terrain vehicle used in sandy land comprising a tread, wherein the tread comprises:

a plurality of primary blocks extending in a tire circumferential direction disposed symmetrically on the tread with respect to a center line of the tread, each primary block being evenly spaced with each other;

two pairs of secondary block arrays arranged respectively on areas between any two adjacent primary blocks which are symmetrical with respect to the circumferential center line of the tread;

a prior ground engaging edge created on a ground engaging surface when the ground engaging surface of the primary blocks is inclined to a moving direction of the tire;

a plurality of stepped humps located on the prior ground engaging edge extending from the center line of the tread to an axially external end; and wherein each secondary block array comprises at least one row of secondary blocks, and each row of secondary blocks substantially deviates from the circumferential center line relative to the moving direction of the tire wherein each secondary block array comprises an inner row and an outer row;

wherein the inner side of each secondary block in outer row is inclined to a normal plane of the ground engaging edge of the said block by an angle included between about 15 degrees to about 30 degrees; and the outer side of each secondary block in outer row is inclined to a normal plane of the ground engaging edge of the said block by an angle included between about 0 degrees to about 15 degrees.

2. The pneumatic tire according to claim 1, wherein the secondary blocks in outer row deviate from the circumferential center line of the tire by an angle included between about 15 degrees to about 45 degrees and the secondary blocks in inner row deviate from the circumferential center line of the tire by an angle included between about 8 degrees to about 30 degrees.

3. The pneumatic tire according to claim 1, wherein the outer side of each secondary block in inner row is inclined to a normal plane of the ground engaging edge of the said block by an angle included between about 15 degrees to about 30 degrees; and the inner side of each secondary block in inner row is inclined to a normal plane of the ground engaging edge of the said block by an angle included between about −5 degrees to about 15 degrees.

4. The pneumatic tire according to claim 1, wherein the ratio of the width of the hump to the width of the primary block is 0.4 to 0.8.

5. The pneumatic tire according to claim 1, wherein the ratio of the interval width of two adjacent humps to the length of primary block is 0.05 to 0.2.

6. The pneumatic tire according to claim 1, wherein the ratio of the length of each secondary block array of the secondary blocks to the circumferential length of a single tread pattern unit is 0.3 to 0.7.

7. The pneumatic tire according to claim 1, wherein the ratio of the height of each secondary block in each secondary block array to the height of the primary block is 0.3 to 0.6, and the ratio of the width of each secondary block in each secondary block array to the width of the primary block is 0.5 to 1.0.

* * * * *